United States Patent [19]
Burgbacher et al.

[11] Patent Number: 5,331,245
[45] Date of Patent: Jul. 19, 1994

[54] PERMANENT MAGNET EXCITED ELECTRIC MOTOR WITH IMPROVED TORQUE RIPPLE

[75] Inventors: Martin Burgbacher, St. Georgen; Michael Hermann, Villingen-Schwenningen, both of Fed. Rep. of Germany

[73] Assignee: Papst Licensing GmbH, Spaichingen, Fed. Rep. of Germany

[21] Appl. No.: 734,443

[22] Filed: Jul. 23, 1991

Related U.S. Application Data

[63] Continuation-in-part of Ser. No. 665,525, Mar. 5, 1991, Pat. No. 5,170,083, which is a continuation of Ser. No. 218,397, Jul. 13, 1988, Pat. No. 4,998,032, which is a continuation-in-part of Ser. No. 140,976, Jan. 6, 1988, abandoned, which is a continuation of Ser. No. 2,957, Jan. 13, 1987, abandoned.

[30] Foreign Application Priority Data

Jan. 13, 1986 [DE] Fed. Rep. of Germany ....... 3600737
Jul. 13, 1987 [DE] Fed. Rep. of Germany ....... 3723099
Jul. 23, 1990 [DE] Fed. Rep. of Germany ... 9010895[U]

[51] Int. Cl.$^5$ .............................................. H02K 1/22
[52] U.S. Cl. ..................................... 310/186; 310/254
[58] Field of Search ................. 310/51, 156, 193, 254, 310/154, 186; 318/254

[56] References Cited

U.S. PATENT DOCUMENTS

| | | | |
|---|---|---|---|
| 1,761,836 | 6/1930 | MacFarlane et al. | 310/193 X |
| 2,235,075 | 3/1941 | Kimball | 310/193 X |
| 3,274,412 | 9/1966 | Fisher | 310/186 |
| 4,012,653 | 3/1977 | Shigeta et al. | 310/51 X |
| 4,804,873 | 2/1989 | Shiraki | 310/254 |
| 4,874,975 | 10/1989 | Hertrich | 310/156 |
| 4,891,538 | 1/1990 | Oudet | 310/254 X |
| 4,998,032 | 3/1991 | Burgbacher | 310/51 |
| 5,047,682 | 9/1991 | Burgbacher | 310/154 X |
| 5,111,096 | 5/1992 | Horst | 310/254 X |

FOREIGN PATENT DOCUMENTS

0169569B1 11/1990 European Pat. Off. .

*Primary Examiner*—Mark O. Budd
*Attorney, Agent, or Firm*—Fitch, Even, Tabin & Flannery

[57] ABSTRACT

A brushless direct current motor has a substantially cylindrical, external permanent magnet rotor having a plurality of north poles and south poles. The rotor surrounds a substantially cylindrical stator provided with a plurality of main poles between which auxiliary poles are interspersed. An annular gap is defined between the rotor and the stator. To reduce magnetic or reluctance caused fluctuation of the motor torque, each main pole of the stator has an angular extent which substantially corresponds to that of a rotor pole. Furthermore, the stator periphery is provided with protuberances arranged such that permanently magnetically caused components of torque ripple are reduced.

16 Claims, 18 Drawing Sheets

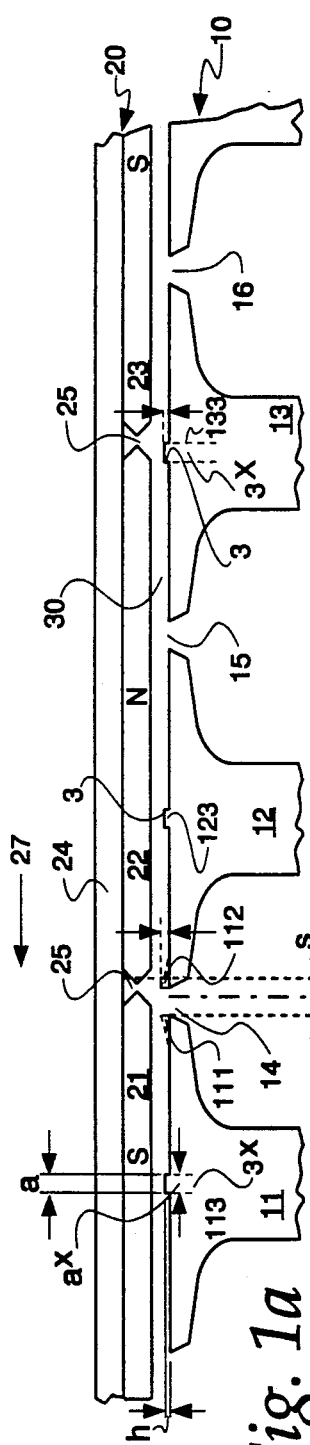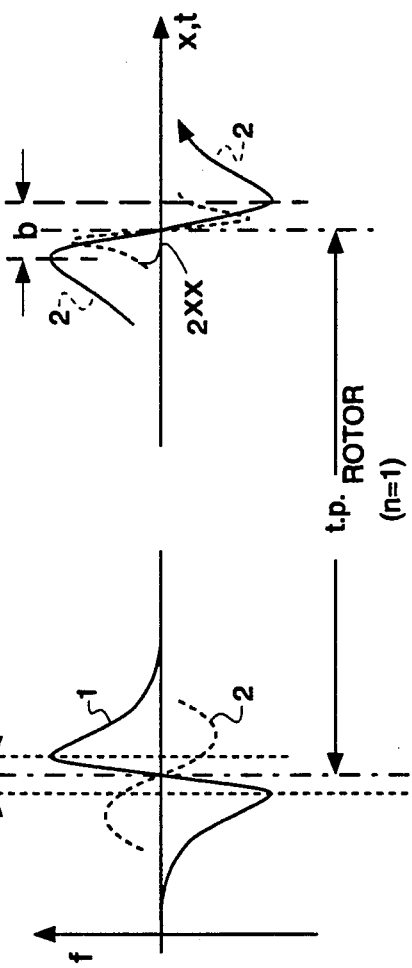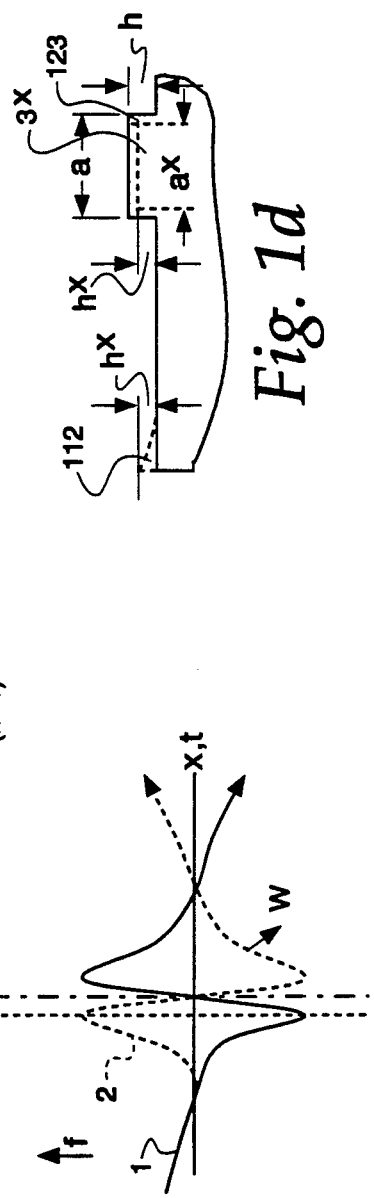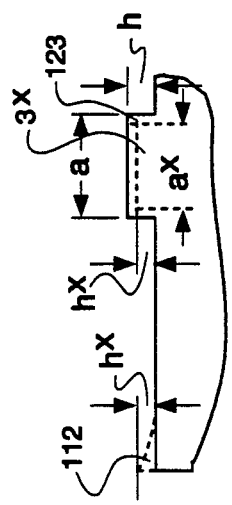

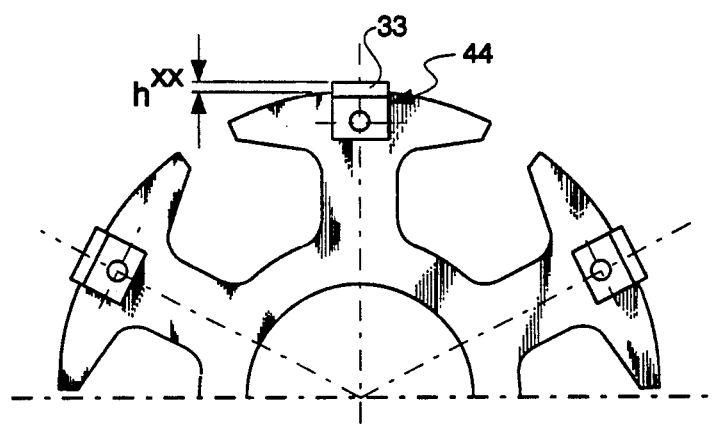
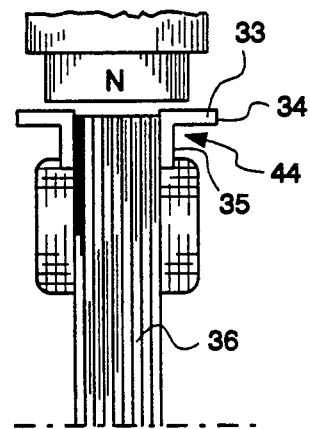
*Fig. 2a*  *Fig. 2b*
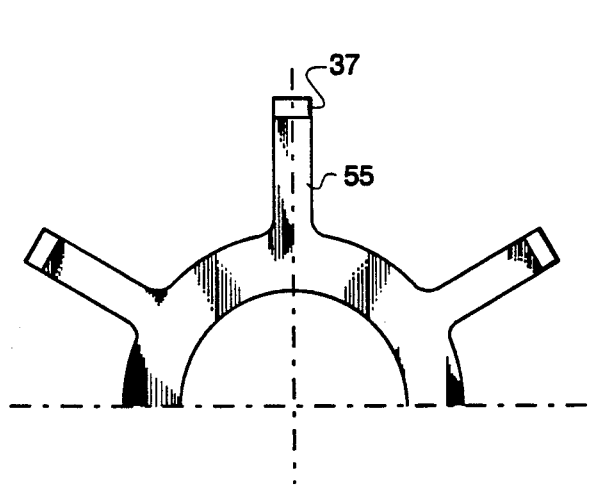
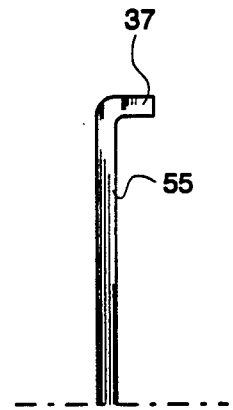
*Fig. 3a*  *Fig. 3b*

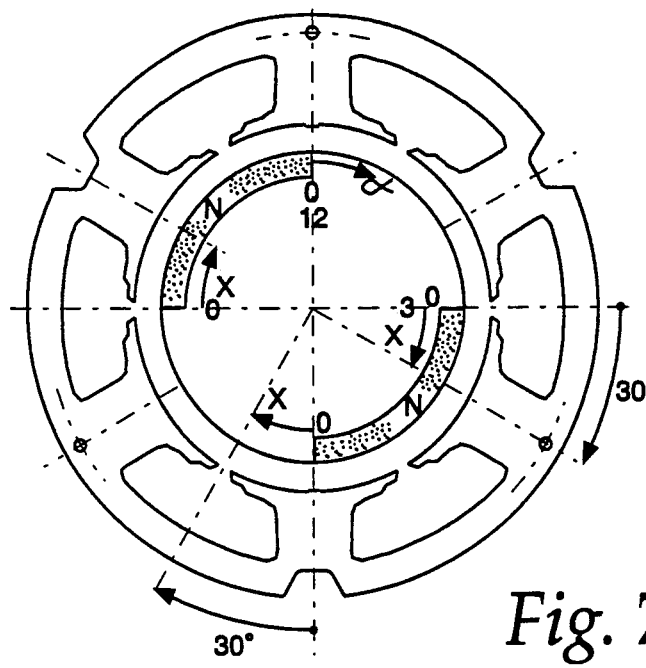
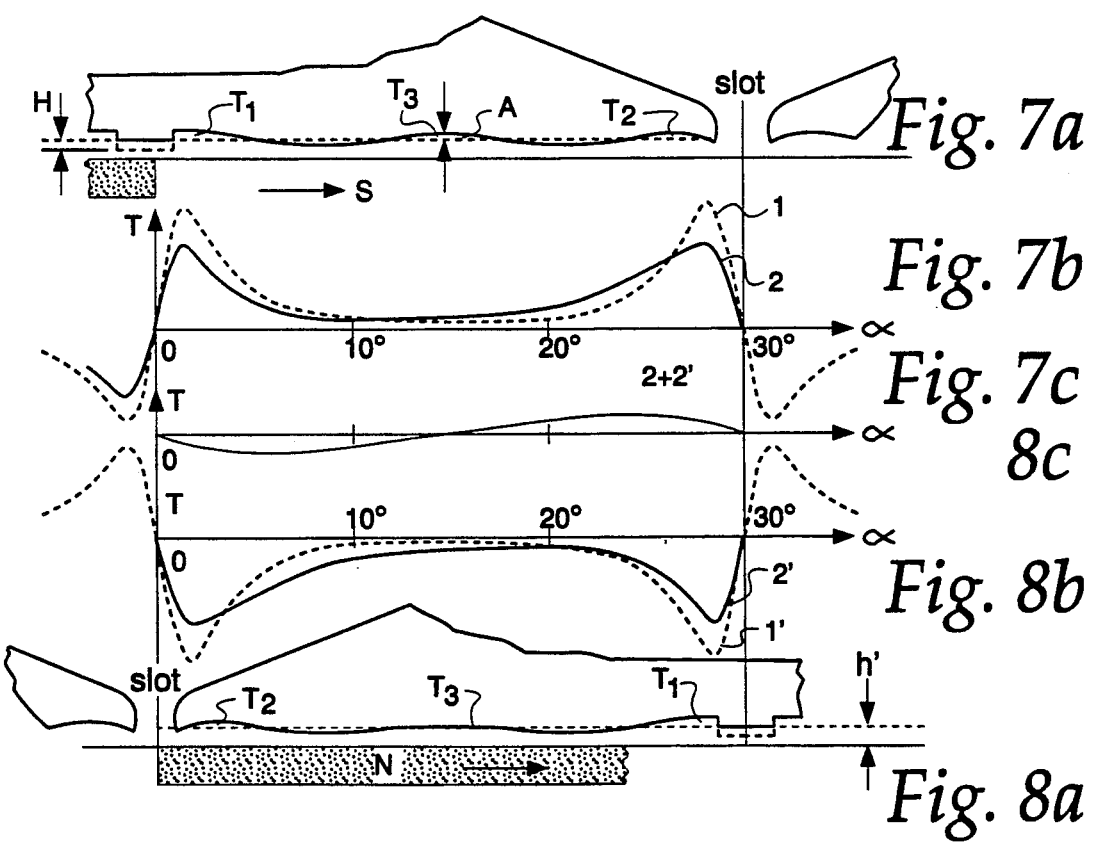
Fig. 7d, 8d
Fig. 7a
Fig. 7b
Fig. 7c 8c
Fig. 8b
Fig. 8a

PRIOR ART

PERMANENT MAGNET EXCITED ELECTRIC MOTOR WITH IMPROVED TORQUE RIPPLE

This is a continuation-in-part of U.S. Ser. No. 07/665,525, filed Mar. 5, 1991, now U.S. Pat. No. 5,170,083, which is a continuation of U.S. Ser. No. 07/218,397, filed Jul. 13, 1988, now U.S. Pat. No. 4,998,032, issued Mar. 5, 1991, which is a continuation-in-part of U.S. Ser. No. 07/140,976, filed Jan. 6, 1988, now abandoned, which is a continuation of U.S. Ser. No. 07/002,957, filed Jan. 13, 1987, now abandoned.

This invention relates to a permanent magnet excited dynamo machine with cylindrical air gap and a slotted core, especially a small brushless dc motor with permanent magnetic rotor poles of a relatively high induction and particularly arranged for driving hard disk drives. Such a motor normally has an external rotor, but also may be made with an internal rotor.

In motors of this type, so-called permanent magnet excited machines (PMEM), interfering or parasitic torques develop because of the interaction between the slots and the edges of the magnetized poles and prevent smooth running of the machine. If the gap between the magnetized poles is smaller, the interfering jerking or parasitic uneven torque component (so-called slot jerking or torque unevenness) tends to be greater.

If motors of this type are to be used in signal processing units with specifications for an extremely compact design, one is forced to use especially strong permanent magnets for the rotor, so-called "rare earth magnets," e.g., those of a samarium cobalt alloy. When such a motor is used for disk memory where the storage plate is only 3.5 or 5¼ inches and must also be located inside the disk hub (with an outside diameter of 40 mm or even as little as 25 mm), i.e., when a relatively high power must be obtained from such a small structural volume, a polyphase winding is used in addition to a rare earth magnet for high air gap induction although this is not easy to manufacture because of the extremely small size. The essentially cylindrical air gap is then generally located radially outside the cylindrical outer surface of the stator so it is around the stator and the radial gap is relatively small even in the case of an external rotor motor.

In this patent application, a primary purpose is to improve the practical examples according to FIGS. 4 to 6. Among other things, a version with a larger number of rotor poles is to be considered here.

Permanent magnetic rotors for such motors are often built from thin half-shells or quarter-shells or radially thin axially stacked rings. The radial thinness of these rotor magnets comes from the very limited diameter of the motor. For extremely small, high power motors, the air gap must also be minimized (air gap: average distance with an eletromotor effect between the iron surface of the stator and the iron surface of the rotor). Thus with the combination of high induction, slotted stator and the smallest possible air gap, this leads to the problem of reducing or preventing if possible the so-called slot torque unevenness which causes problems in a motor with the most constant possible torque. At the same time because of the danger of grazing or because of the manufacturing expense, a "minimum mechanical size" is needed for the air gap.

If the permanent magnetic rotor is also to be magnetized trapezoidally, this offers power advantages but at the same time the problem becomes even more severe in comparison with the conditions with sinusoidal magnetization.

It is known from German document DE-OS No. 2,823,208 that a certain periodicity can be provided in the stator surface at the air gap in order to reduce the third harmonic in the torque so the air gap is varied in a periodic manner over the periphery.

One or more coils may be wound onto a multi-polar stator, which may also have commutating poles. There is a sequential current flow through these coils across semiconductor switches, normally transistors, and rotor movement is brought about by the interaction with the permanent magnet poles. The rotor position must be determined for a clearly defined switchover of the coils, and generally this takes place in a contactless manner. For example, magnetogalvanic sensors, particularly in the form of Hall generators, are available for this purpose. However, the rotor position can be determined using only existing motor elements and without additional sensors. In particular, in the case of a moving rotor, the voltage induced in the coils can be used to determine the actual rotor position. However, an associated evaluation electronic circuit is required for such a motor commutation.

A reduction of the periodic torque fluctuations, which are caused by the interaction between the design of the ferromagnetic stator material and the course of the rotor magnetic field intensity over the rotation angle, can be brought about by the stator design as described in DE-OS 37 23 099 A1 and U.S. Pat. No. 4,998,032. The procedure described therein makes it possible to provide an overall torque with low ripple. However, as a function of the angular position of the rotor in the motor starting phase, there are divergences from the average starting torque.

Another method for reducing torque fluctuations of the aforementioned motors is described in EP-291 219. According to the procedure described in this specification, a number of stator poles, $3(2n+1)$, and a number of rotor poles, $3(2n+1)+-1$, are provided for a polyphase motor, that is, the number of stator poles is kept approximately the same as the number of rotor poles. This also reduces torque fluctuations during starting or idling and is indicated by the upper envelope curve of FIG. 7.

However, in general, this method requires at least nine wound coils per motor, whereas the earlier described arrangement only requires, for example, six coils, and is therefore much less expensive from this standpoint. In addition, in the method of the European specification, there are normally periodically occurring radial forces which have different directions and can cause disturbing motor or engine noise.

Furthermore, in this method, the winding direction of the coils is not unitary, which means additional costs for the manufacture of the motors.

Another arrangement for reducing electromagnetically caused torque ripple is described in DE-OS 34 32 372, which has a stator arrangement with six main poles and six commutating poles, as well as a rotor with eight magnet poles. This torque behavior is shown by the (phase-to-phase) induced voltage of both phases. However, this arrangement leads to a disturbing ripple of the permanent magnetically generated torque.

This invention is based on the problem of achieving even smoother operation of motors of the type defined initially despite the high field concentration in the air gap. In addition, especially the average air gap (see above definition) should also be reduced. Motors with a larger number of poles should also be optimized.

The short peripheral elevations (hump-like protrusions) according to this invention narrow the air gap partially above the stator pole and act like "magnetic cogs," exerting forces on the rotor that are utilized to even out the torque. The cross section of these cogs is approximately rectangular and is in (or at) the middle of each stator pole in an important version of this invention.

The present invention also seeks to provide electric motors, and in particular motors of the aforementioned type, having a uniform, e.g., angular position-independent overall torque, both during starting and at the rated speed. This means that the electromagnetically produced torque must have a low ripple, i.e., few fluctuations about a mean value in these two operating states.

In addition, the motors should be inexpensive to manufacture and also have a low noise level. Finally, on supplying current to the stator, only force couples (torques) without excess radial forces must be generated.

According to the present invention there is provided an electric motor having a stator and a magnetic rotor, wherein the stator has a number of main poles and commutating poles, the contour shapes of the poles being arranged such that magnetic or reluctance-caused fluctuation of the motor torque is minimized as a function of the angular rotation and wherein the angular extent of each said main pole of the stator substantially corresponds to that of a rotor pole.

The applicants have found that an effective reduction of the electromagnetically caused torque ripple is possible through an appropriate modified design of stator. For this purpose, stator commutating poles are provided, while the ratio of the stator pole number to the rotor pole number is selected in such a way as to obtain a so-called full-pitch motor winding.

In order to also eliminate permanently magnetically caused components of the torque ripple, a special design of the stator periphery and therefore of the air gap is provided, particularly having cam-like protuberances on the stator poles.

The invention also extends to an electric motor having a stator and a multipolar magnetic rotor, wherein the stator has substantially planar end faces, and at least one of said end faces is greater in dimension than an intermediate cross-section of the stator taken between the end faces, and wherein the stator end faces are magnetically influenced by one or both end faces of the rotor magnet.

BRIEF DESCRIPTION OF THE DRAWINGS

Embodiments of the present invention will hereinafter be described, by way of example, with reference to the accompanying drawings, in which:

FIG. 1a shows a developed longitudinal section of a motor according to this invention in a first version whereby the ratio of the number of stator poles to the number of rotor poles is 3 to 2.

FIG. 1b shows a diagram of problem causing slot torque unevenness 1 and the course of the useful torque component 2 according to this invention;

FIG. 1c shows combined curves 1 and 2;

FIG. 1d is an enlargement of a portion of FIG. 1a;

FIGS. 2a, 2b show an alternative element or an element to be used in addition with an effect similar to that of the first practical example according to FIG. 1a;

FIGS. 3a and 3b show an easy to manufacture alternative solution to FIGS. 2a and 2b, where FIGS. 2a and 3a each show the end view in axial direction and FIGS. 2b and 3b each show a section through the diagrams according to FIGS. 2a and 3a;

FIGS. 7 and 8 illustrate how another version operates;

DESCRIPTION OF THE PREFERRED EMBODIMENTS

Figure 4:
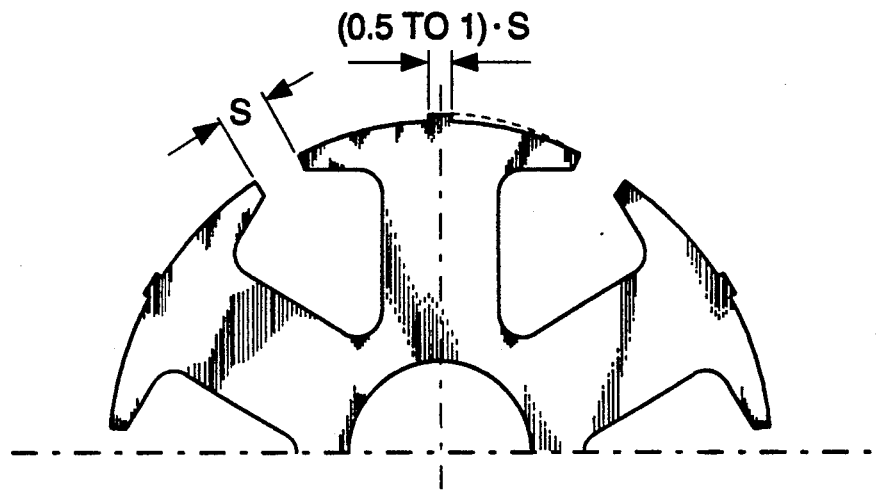
FIG. 4 essentially shows the first variation according to FIG. 1a approximately four times natural size where the air gap is tapered toward the stator pole end where it matches the cylindrical surface which also surrounds the elevations according to this invention.

In detail, FIG. 1a shows the partial developed view of a 6-pole stator with concentrated poles 11, 12, 13 and a 4-pole rotor with the permanent magnet poles 21, 22, 23 between which the peripherally narrow pole gaps 25 and 26 are arranged, while the stator slot orifices 14, 15 with their width 's' indicate the distance between two stator pole ends. Looking concentrically toward the middle of each stator pole one can see the magnetic cogs 3 (numbers 113, 123, 133) with their peripheral dimension 'a' and height 'h'. Between the stator 10 and the rotor 20, there is the air gap 30 bordered by the stator pole heads and the permanent magnets of the rotor 21, 22, 23. A soft magnetic short-circuit layer 24 surrounds the four rotor poles 21–24. With rotation, i.e., movement of rotor 20 in the direction of arrow 27, the problem causing uneven parasitic torque, i.e., the unevenness torque component according to curve 1 in FIG. 1b, occurs due to the interaction of the stator slot orifice 14 and the rotor pole gap 25. At the same time, an uneven torque component in phase opposition according to curve 2 also occurs at the distance of the rotor pole pitch $\tau_p$ rotor due to the interaction of the magnetic cog 133 with the rotor pole gap 26, and namely this occurs in the area of the rotor pole gap 26. FIG. 1c shows the superposition of curves 1 and 2. The instantaneous curve of the damaging uneven parasitic slot torque effect occurs when the permanent magnet of a high induction, e.g., 21, travels with its end (in the area of pole gap 25) away from stator pole 11 over the open slot 14 to the next stator pole 12.

This has been confirmed by measurements which have shown that when the edge of slot 14, for example, is between the poles, e.g., between 21 and 22, the maximum unevenness occurs as shown by the shape of curve 1 in FIG. 1b. Therefore, the distance between the peaks in curve 1 corresponds to the width 's' of the slot orifices, e.g., 14.

In order to adapt the distance 'b' of the peaks of the compensation component (curve 2) of the cogs 3 according to this invention to this distance 's', it is important to optimize the cog width 'a' in this sense, because the problem-causing torque (curve 1) is fully compensated by curve 2 for b=s. This optimum cog width is in the range of 'a'=0.5 to 1 xs but is influenced by the inductance pattern of the permanent magnet.

It has thus been found that uneven torque components which have almost the same diagram as those of the slot openings orifices (see curve 1) with appropriate dimensioning and positioning of the "magnetic cogs" (3) can likewise be produced. If these "cogs" are arranged in such a way that their average distance from the respective slot opening is equal to one pole pitch of the rotor (p) or an integral multiple thereof, then the uneven torque component of the "cogs" is in inverse ratio to that of the slots, i.e., the unevenness is compensated (see curve 2).

The peripheral width 'a' of this cog, i.e., its dimension in peripheral direction, may amount to only a small fraction of the stator pole pitch. There is an optimum between this peripheral width 'a' of the cog and the slot width 's' between these stator poles (or stator heads) so even a very small cog width 'a' also permits a simultaneous enlargement of the slot because the conditions are otherwise the same (which facilitates manufacturing of the windings).

Especially with a 6-slotted motor of a 3-phase winding with four rotor poles as disclosed in German document DE-OS No. 3,122,049, it is found that this invention yields an excellent reduction in this unwanted slot torque unevenness.

Optimization experiments have shown that narrowing the air gap toward the ends of the stator heads through locations that project radially, e.g., points on the stator pole end as known from German document DE-OS No. 2,919,581 or 3,049,494 with so-called reluctance motors yields another improvement for the present problem.

Figure 5:
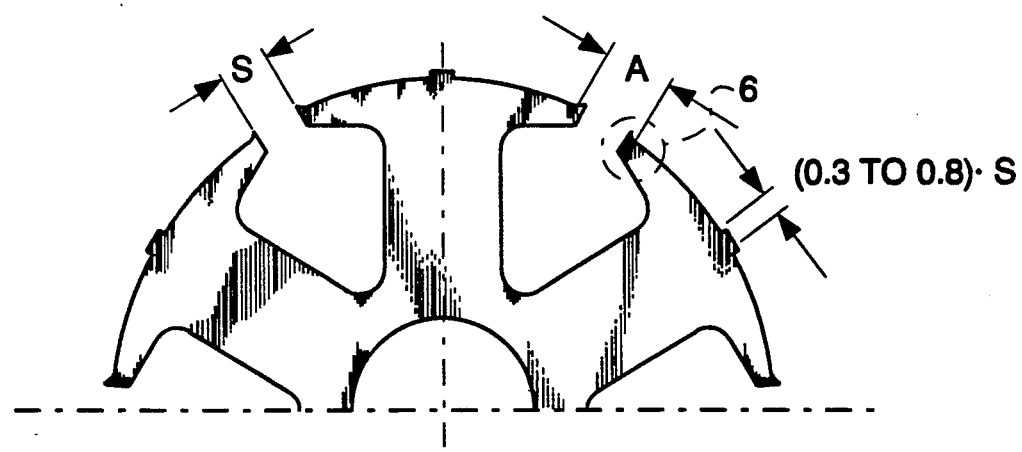
FIG. 5 shows a second version, where ends tapering radially in a point toward the pole end are provided.

Providing the stator heads with pointed ends 6 according to FIG. 5 have an effect similar to that of cogs. But since their distance A is always larger than the slot orifice width 's', their curve $2^x$ has a smaller amplitude and their position is also shifted away from the middle of the slot. This results in a relatively large harmonic which is why these points are optimally combined with an even narrower cog ($a^x=0.3 \cdot S$ to $0.8 \cdot S$). It has surprisingly been found that the same ratios are achieved with a reduced cog height $h^x=0.05$ to 0.2 mm at the same time and thus a further favorable reduction in the average air gap width is possible.

In FIGS. 1a/1b, this is illustrated by representing this second solution with a dash-dot/dotted line. The compensation effect of the attached tips 111, 112 corresponds to curve $2^x$, and the compensation effect of the cam $3^x$ which is shorter in the periphery corresponds to curve $2^{xx}$ (see FIG. 1b). Both effects take place simultaneously with the overall effect as illustrated in curve 2 but this result occurs at a small $h^x$, so the average air gap is smaller and the motor is stronger. This surprising refinement is all the more welcome since a certain oversize must be added for manufacturing tolerances in addition to the minimum theoretical air gap in designing motors and with regard to the air gap in motors of this small size, each 1/10 mm is important.

The cog height 'h' determines the height (amplitude) of the maximum. This can be implemented as part of the usual air gap widths (0.3 mm to 0.6 mm) as h=0.1 mm to 0.3 mm high accordingly (case shown in FIG. 4). In order to minimize the average increase in air gap caused by presence of the cogs, it is also proposed that the diameter from the slot opening be increased continuously to that of the cog diameter in accordance with FIG. 4.

As an alternative or in addition, a "cog-like" effect can already be achieved in the slotted area by means of magnetic closing thereof by means of ferromagnetic slot parts as known from German document DE-AS No. 1,194,043.

Essentially it seems possible to apply this invention to slotted rotor packages as well. When these rotate in the field of permanent magnets (then on the stator side), smooth running can also be improved there. However, this version means that a mechanical collector is required. In special applications, motors used may also need an improvement in running properties by reducing the slot torque unevenness.

FIG. 2a shows ferromagnetic angles 33 riveted onto the stator core with their axial legs 34 projecting beyond the core 36 so the air gap between them and the outer rotor magnet N is reduced. Therefore, these axially directed legs 34 act like magnetic cogs according to this invention in the middle of the pole. This solution is definitely a compromise because on the whole this means that the effective air gap between the rotor and stator (N, 36) (FIG. 2b) is relatively large. However, no special punching tool need be provided to produce the core 36. The angles are attached axially on both sides to the ends of the stator core as illustrated in FIG. 2b. However, the rotor magnet which projects axially together with the angles 33 projecting axially beyond the stator core, especially axial leg 34, yield an effective and inexpensive application of this invention or may even effectively improve an arrangement according to FIG. 1.

FIGS. 3a and 3b show how the angle 34 can be replaced by end plates with angled axially projecting tabs 37.

Figure 6A:
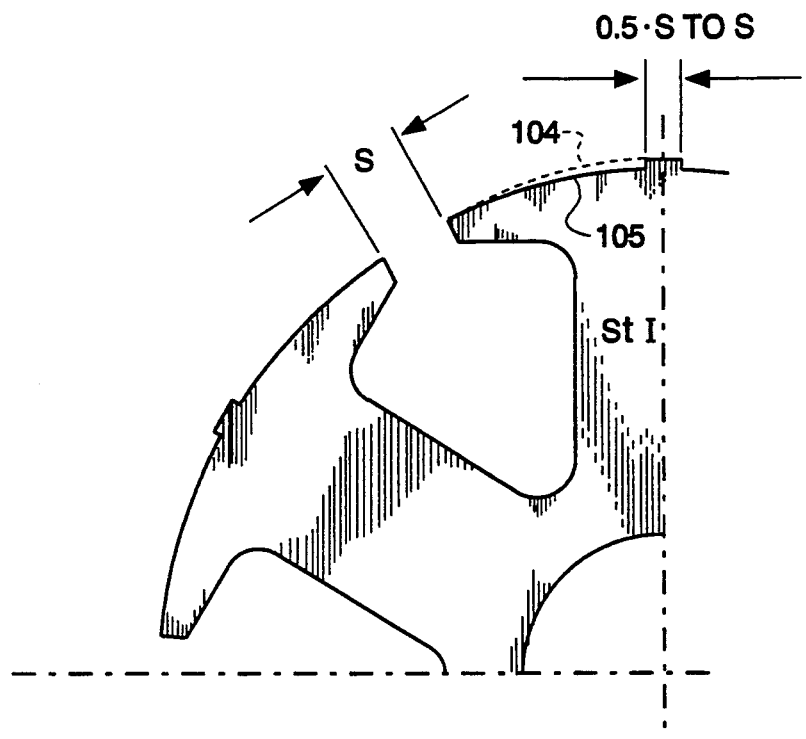
FIGS. 6a and 6b show the stator contours of FIGS. 4 and 5 in an enlarged diagram.
Figure 6B:
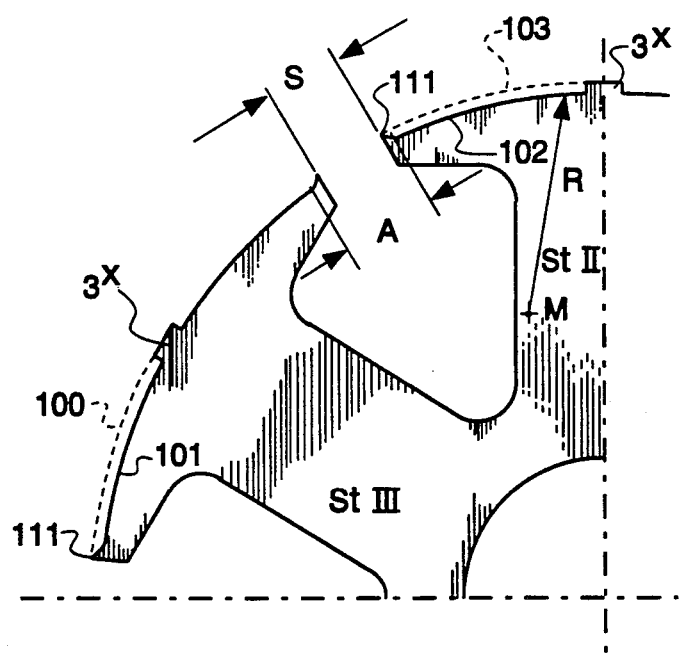

FIGS. 5 and 6b show a reduction in air gap toward the stator pole ends (as indicated with a dash-dot line in FIG. 1a), so the peaks of the respective torque effects (curves $2^x$) are further apart (corresponding to the distance A) than the slot orifice width 's'. This effect was explained in connection with FIG. 1. A circular cylindrical elevation 102, 105 toward the cylindrical sheathing surface 103 starting from the recess next to cog $3^x$ and extending to the recess next to the tip 111 at the stator pole end is provided in the area around the middle between the respective stator pole middle and any stator pole end so the average air gap diameter is effectively reduced (see FIG. 6b stator pole St II). The radius of curvature R of this elevation 102, 105 is much smaller than that of the enveloping surface 103, 100, 104 (FIGS. 6a, 6b). The midpoint M of the curvature 102, 105 is located between the rotor axis and the stator pole head.

FIG. 5 shows primarily cylindrical concentric stator pole faces whose midpoint of curvature is in the rotor axis (as shown more clearly by areas 100, 101 in stator version St III in FIG. 6b).

The relationships illustrated in FIG. 6b will be further optimized according to this invention.

In FIGS. 7 and 8, operation according to this invention is illustrated further by comparing the conditions here on a 6-pole external stator and a 4-pole internal rotor, namely the uneven slot torque components and their reduction, their superposition as they actually occur in the example shown here, e.g., at the 12 o'clock position or at the 3 o'clock position. At the 12 o'clock position, one north pole reaches the area of the stator pole middle and at the 3 o'clock position one north pole, for example, leaves the slot middle area. These two pulsating components are mutually superimposed in a decelerating and driving manner so they cancel each other out. The conditions in the area of the stator pole middle at the 12 o'clock position are illustrated in FIG. 7 and the conditions in the slot area at the 3 o'clock position are shown in FIG. 8. Subfigures 7a, 8a show the stator contour with the air gap enlargement areas $T_1$, $T_2$ and $T_3$ as defined herein. Curves $1a$–$1d$ show the slot pressure moments which occur when only one cog is provided in the stator pole middle and the stator pole head area is also cylindrical. If indentation $T_1$ is placed next to the cog and indentation $T_2$ is placed in front of the stator pole end as described above, the pulsating component is reduced so the height of the cog can be greatly reduced so its outer face toward the air gap is at approximately the same level as the tip of the stator pole at its end. In this way, a drastic air gap reduction is already achieved as described above. These two components are illustrated by curve 2. The curves 2 and 2' then do not yield a zero line as the sum of 1 and 1' but instead this sum curve 2 and 2' has a certain waviness which is a relative disadvantage, but this effect can be further reduced or eliminated by providing a relative air gap enlargement $T_3$ between the stator pole middle and the stator pole end which is about 1/10 the stator pole width in the circumferential direction and on the whole is much smaller than the air gap enlargement next to the cog and at the pole arc end. Because of this enlargement $T_3$, the waviness in the sum group 2 and 2' can be further reduced, and again we have a sum moment of zero. This means that the average air gap reduction can be accomplished without the disadvantages of such a pulsating extra component.

Figure 9A:
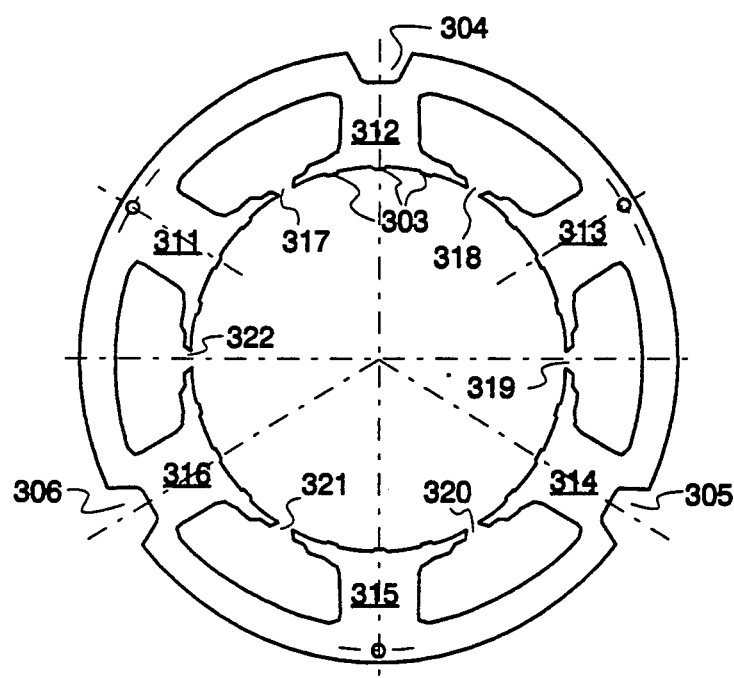
FIGS. 9a, 9b, 9c and 9d relate generally to an internal rotor motor of the invention showing a plurality of raised portions on each of the stator poles.
Figure 9B:
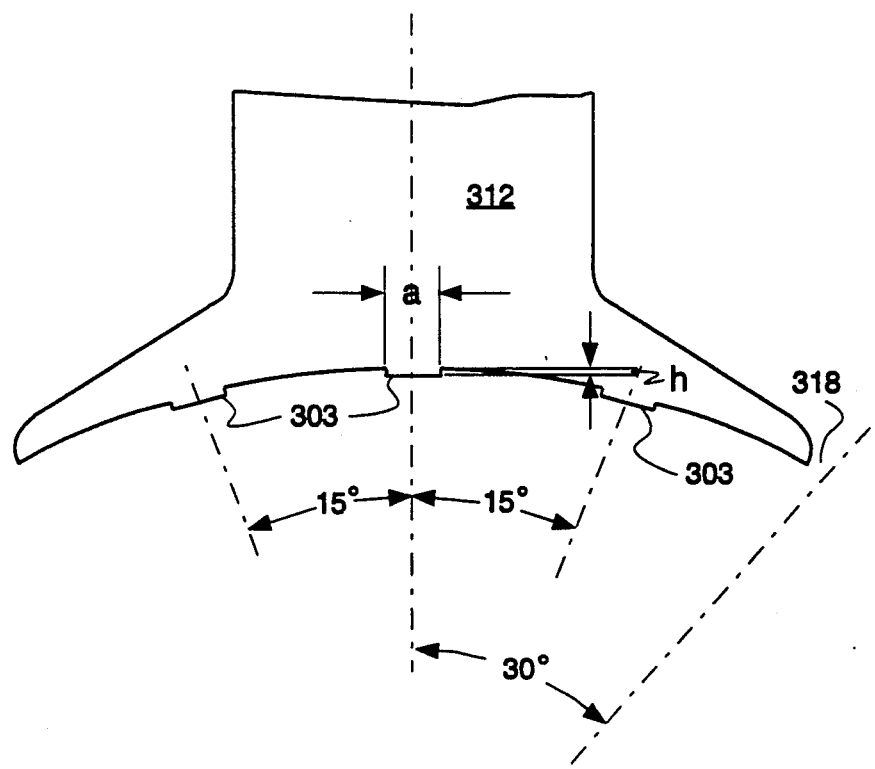
Figure 9C:
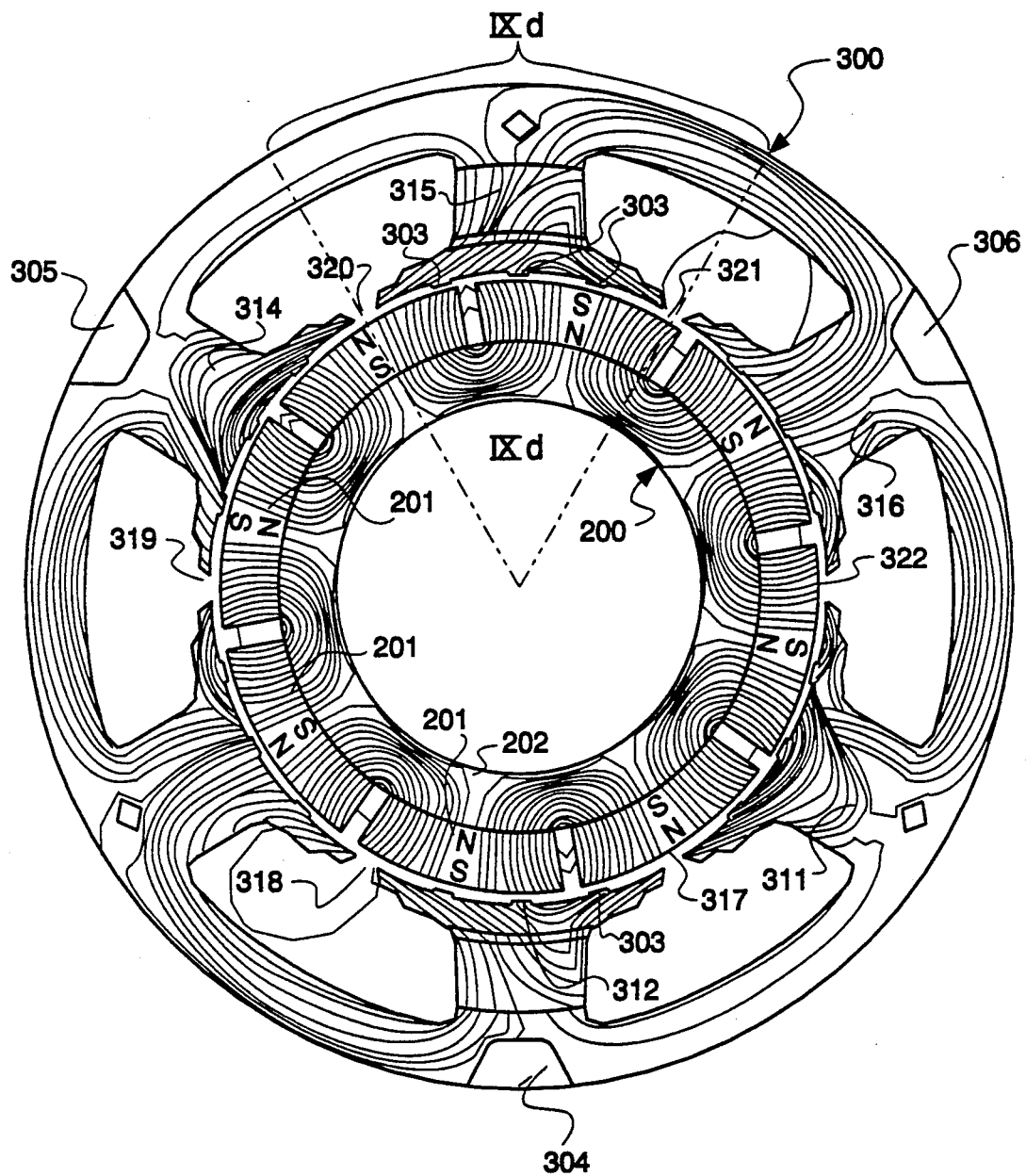

FIG. 9a shows a complete stator section with six outer stator poles for an 8-pole inner rotor as shown in FIG. 9c. According to this invention, three cogs 303 are provided on each stator pole 311–316 in such a way that one sits centrally in the middle of the stator pole and another cog sits between the middle of the stator pole and the middle of one slot 317–322 so there is an equidistant distribution of three cogs 303 between two stator slots (adjacent). Between two adjacent cogs 303 or between one cog 303 and the adjacent stator pole end, the finer refinements as described above in combination with FIGS. 4 to 7 can also be used in addition.

FIG. 9b shows the dimensional relationships of a single stator pole in an enlarged detail. The cog height (h) here may be 0.2 mm. The cog width (a) in the peripheral direction may be 1.8 mm. The mechanical distance between two cogs and between one cog and the adjacent slot is 15 mechanical degrees. The air gap diameter may be about 50 mm.

FIGS. 7a and 8a also show the additional recess in the middle between the cog in the center of the stator pole and the adjacent slot as about 1.1 mm with an air gap diameter of about 50 mm.

FIG. 9, i.e., FIGS. 9a to 9d, show a practical example with an 8-pole rotor of the motor with 6 slots in the stator.

With a larger number of poles, each slot can be compensated by several cogs, e.g., three shown in FIG. 9. In this way the cog height can be reduced to ⅓ the height that would otherwise be required in the embodiments of FIGS. 1 to 8.

This invention can fundamentally also be used with other air gap forms, e.g., with a planar air gap, but this form of implementation requires additional measures because the stator pole width must be varied in the longitudinal direction of the slot, for example.

FIG. 9c shows an enlarged and more complete computer printout of the parts of the magnetic circuit for the practical example according to FIG. 9a where the laminated stator 300, the internal rotor 200 with its 8 permanent magnet poles 201 can be seen mounted on the magnetic flux return path 202 which is preferably designed as a soft iron hollow cylinder.

Figure 9D:
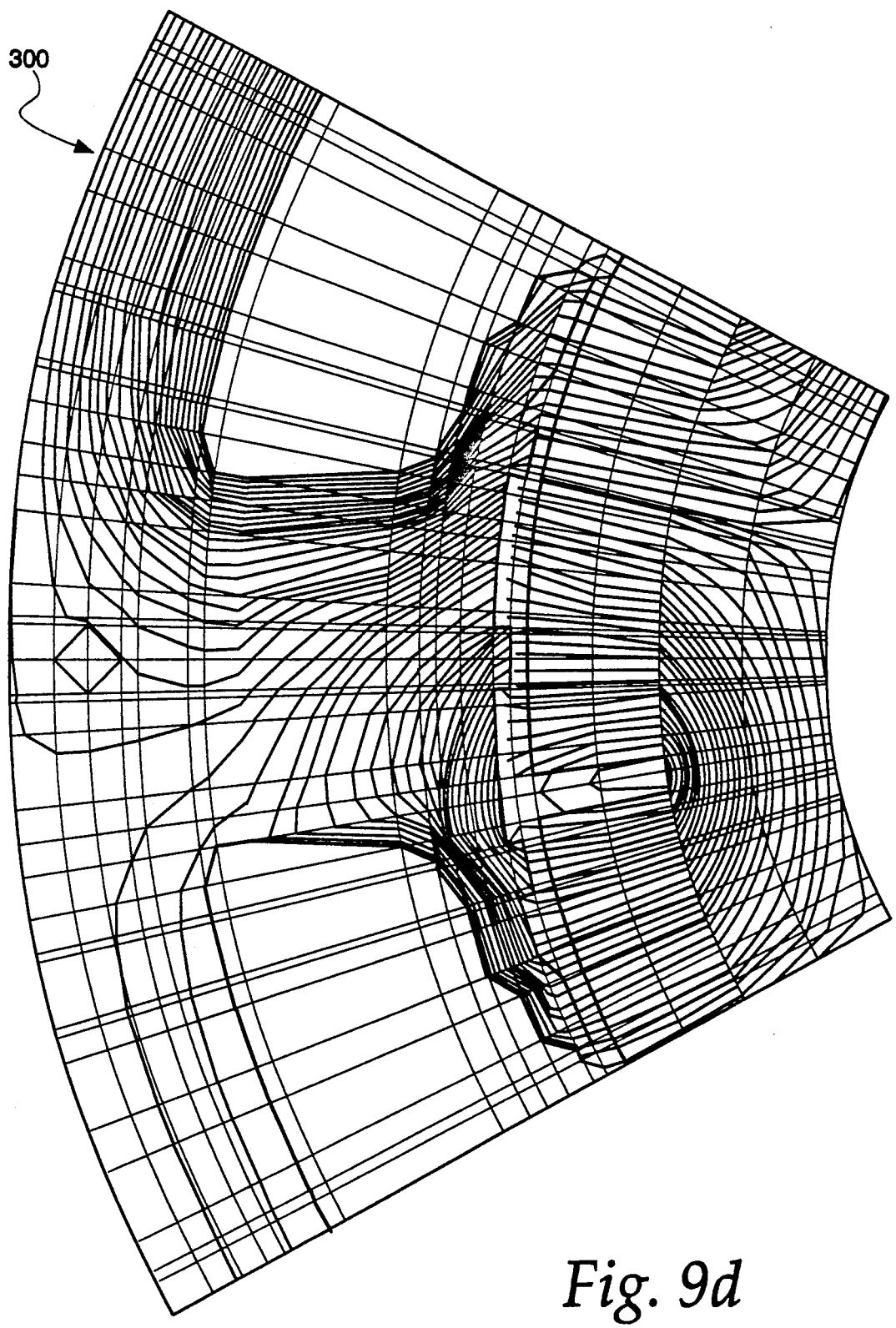

FIG. 9d shows a detail of an enlarged cutaway sector indicated as IXd in FIG. 9c. The field line pattern was also printed out by computer. Cutouts 304, 305 and 306 distributed uniformly on the outer perimeter of the stator yoke can be used for mounting in a motor casing, e.g., by having the parts of the motor casing fit in a form locking manner into these cutouts.

The six stator poles are each provided with a concentrated winding (not shown) where two diametrically opposed windings are excited simultaneously, e.g., by having the two windings connected in series.

Turning attention to further aspects of this invention, the specification uses throughout terminology in respect of the torque components of an electric motor as is explained in DE-OS 39 41 553 and U.S. Pat. No. 4,998,032. In particular, these torque components can be differentiated as electromagnetic, permanent magnetic, reluctant or mechanical components.

Figure 10:
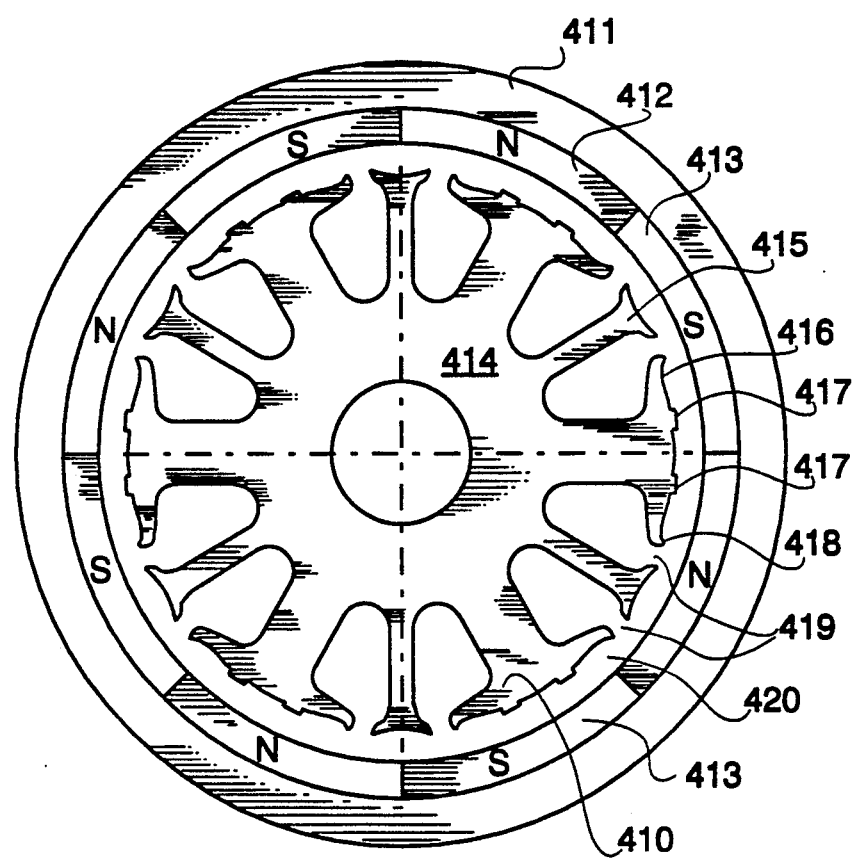
FIG. 10 shows the geometrical design of a stator having six main poles and six commutating poles, and of an associated permanent magnet rotor.

The arrangement of stator poles and magnetic poles in a motor of the invention is illustrated in FIG. 10. As can be seen, a multipolar permanent magnet having north poles 412 and south poles 413 is surrounded by an associated, external, substantially cylindrical iron yoke 411. The magnet 412, 413 and its associated iron yoke is arranged around, and surrounds a substantially cylindrical, fixed stator 414. An annular air gap 420 is defined between the stator 414 and the permanent magnet. The actual stator 414 is provided with a series of spaced main poles 410 between which auxiliary poles 415 are interposed. The main poles 410 and auxiliary poles 415 are spaced by slots 419. The main poles 410 are each provided with protuberances 417 and contour corrections or extensions 416. The auxiliary poles 415 may also have contour modifications differing from the circular shape if required. The contour shape of a preferred embodiment is shown on a larger scale in FIG. 11. At least the main poles 410 are provided with one or more coils wound in bifilar manner. The commutating or auxiliary poles 415 may also be equipped with coils.

A stator main pole 410 extends over substantially the same angle as a magnet pole 412, 413, so that there is a so-called full-pitch winding. This means that there is an almost linear rise or fall of the induced voltage with the angular position of the rotor as can be seen at 483 in FIG. 17. This voltage is the phase-to-phase voltage of two phases of the stator, which in all three phases is interconnected in a star connection.

The presence of the auxiliary or commutating poles 415 provides a substantially trapezoidal path 484 for the induced voltage curve, which simultaneously represents a measure for the generated torque against the angular position.

Figure 17:
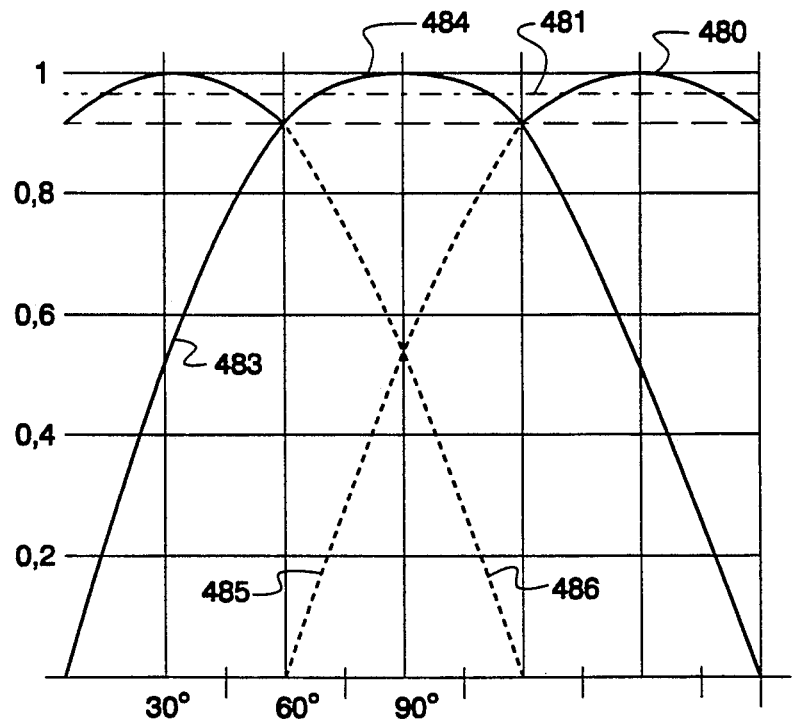
FIG. 17 is a graph showing electromagnetically caused torque configuration against rotor angular position for a motor of the invention.

As can be seen in FIG. 17, the electromagnetically generated torque from commutating angle 485 to commutating angle 486 only has a limited ripple, the mean value being approximately 98% of the maximum torque, whereas the minimum value is approximately 93% of the maximum torque.

The described, electromagnetically generated torque of the motor is only generated when a current flows through the coils. The alternating moment of the jerking, which has a permanent magnetic origin, is substantially constant.

For the limited ripple of the electromagnetically produced torque, any additional slot jerking, which may be generated by a conventional stator pole shape, constitutes an undesired interference factor. Furthermore, the objective of being able to start the motor from all angular positions with the same movement sequence, may not be attainable.

Figure 11:
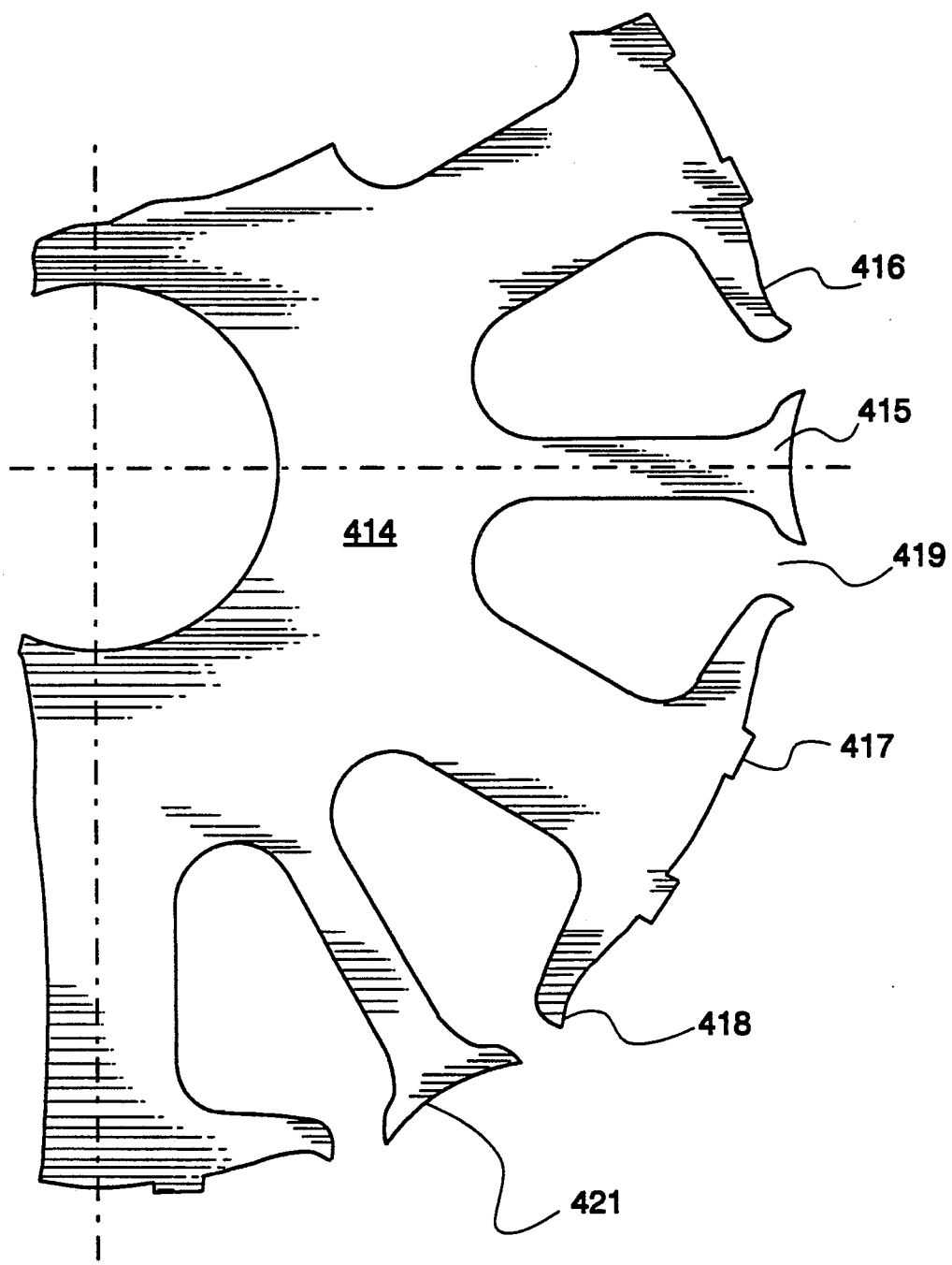
FIG. 11 shows an enlargement of part of FIG. 10 detailing the contour of the stator periphery.
Figure 12:
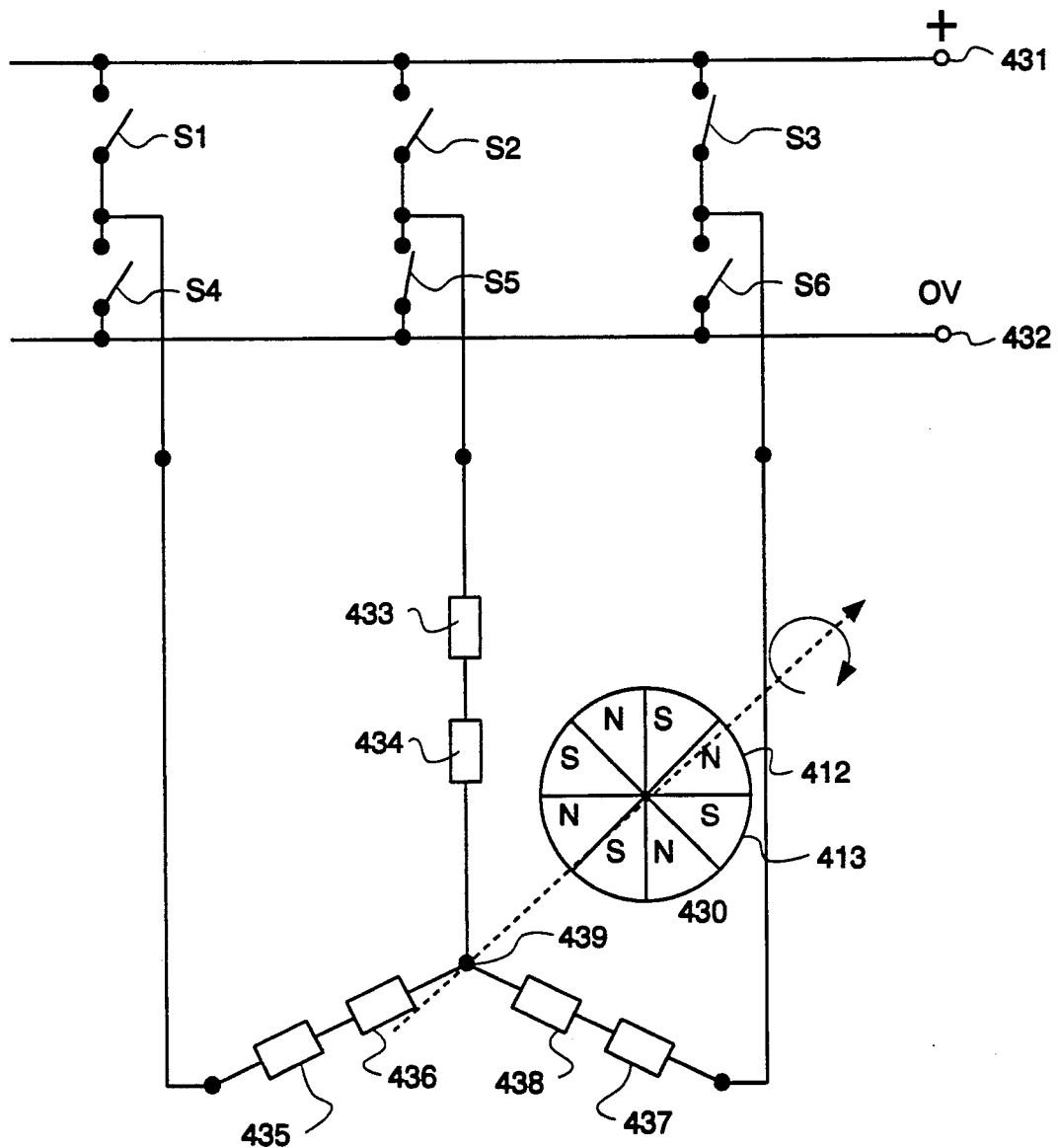
FIG. 12 shows an electrical control circuit for a motor having eight permanent magnet poles and a stator as shown in FIG. 10.
Figure 13:
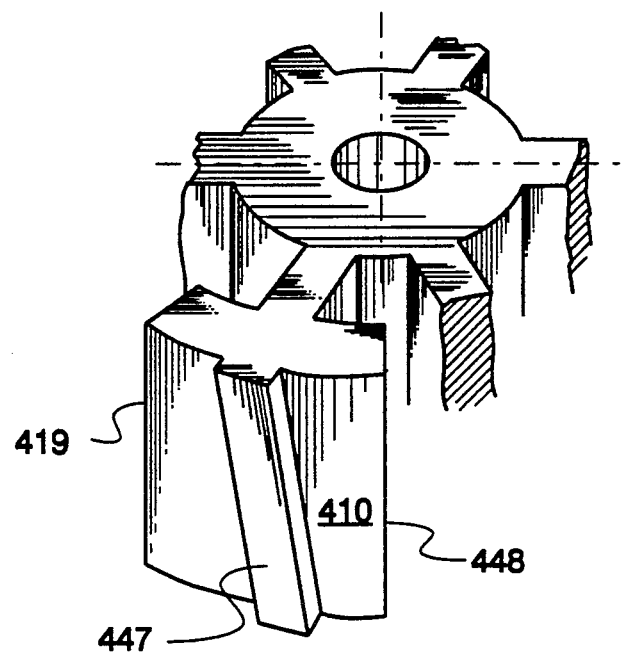
FIG. 13 shows a perspective view of part of the contour of a stator having a sloping stator protuberance ("cam")
Figure 14:
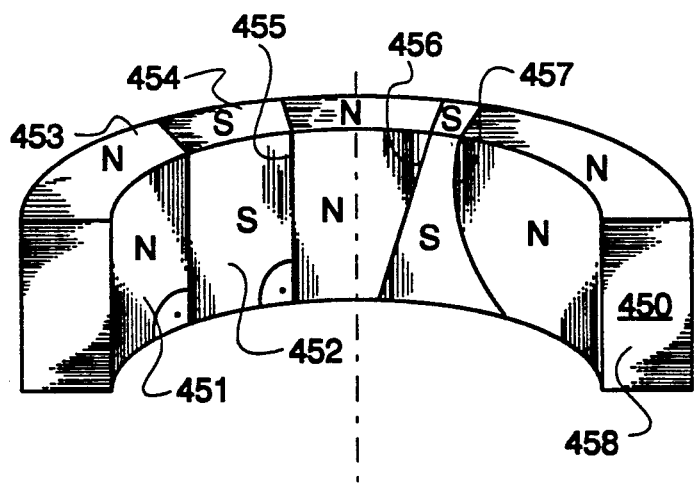
FIG. 14 shows boundary lines of the magnetization of a rotor in the case of regular and sloping magnetization.

Accordingly, to reduce slot jerking and to give the required starting characteristics, the stator poles are provided with the contour changes 416 and 417, shown most clearly in FIG. 11, to minimize the remaining, permanent magnetically caused torque fluctuations, without producing a detrimental influence on the motor efficiency.

As a result of this interaction of the basic stator shape 414 with the stator contouring shown in FIGS. 10 and 11, and of the utilization of an almost rectangular magnetization of the rotor permanent magnet (i.e., a rapid change of the induction sign at the pole boundaries of the rotor), a better electromagnetically generated torque is made available than has hitherto been possible with similar motors.

The motor and its load, for example, an associated, permanently connected or replaceable magnetic memory disk, are accelerated substantially equally well from each starting position. Despite low motor currents, particularly starting currents, the risk of a starting failure is significantly reduced.

Figure 15:
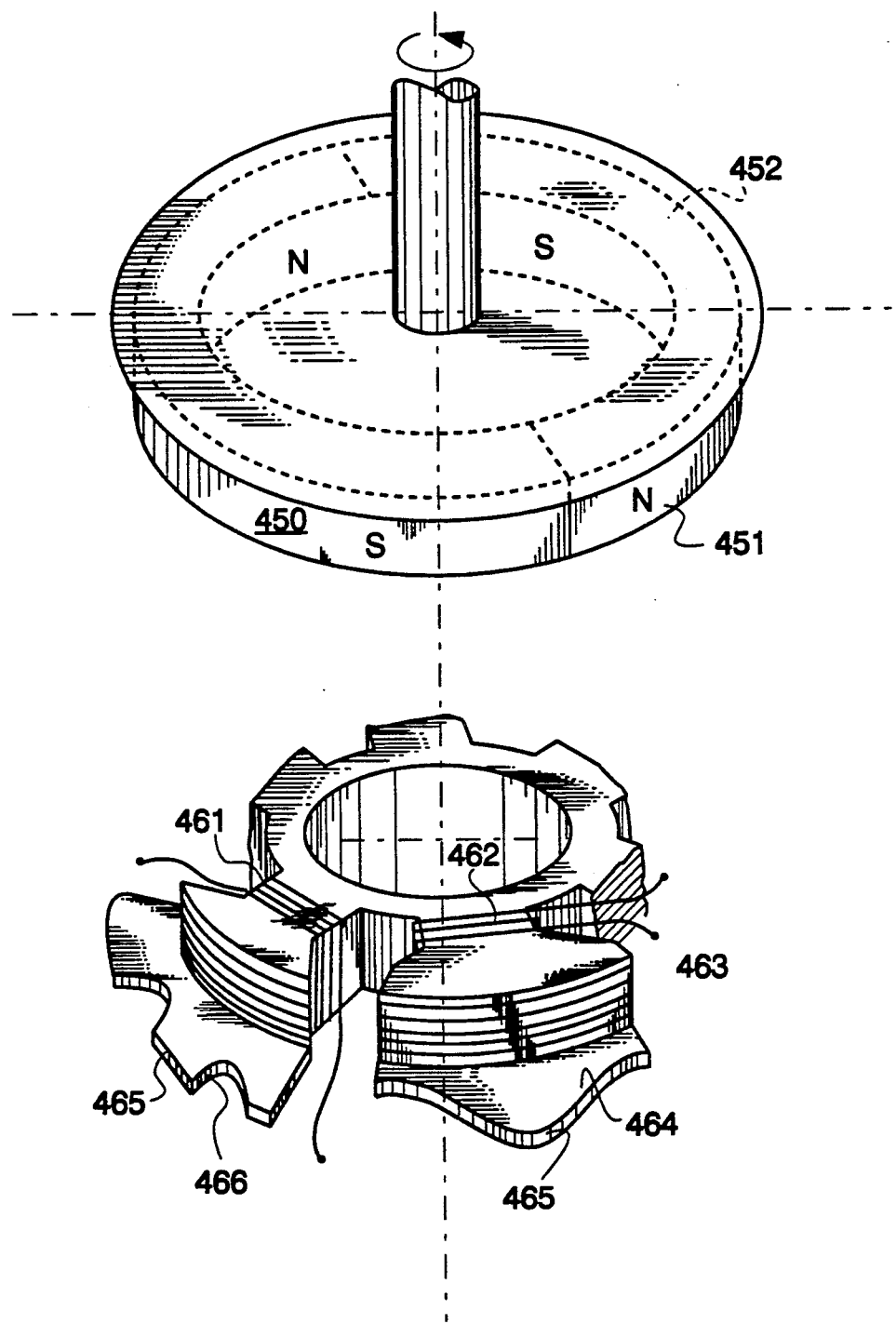
FIG. 15 shows a perspective view of part of a modified stator having a stator extension plate.
Figure 16:
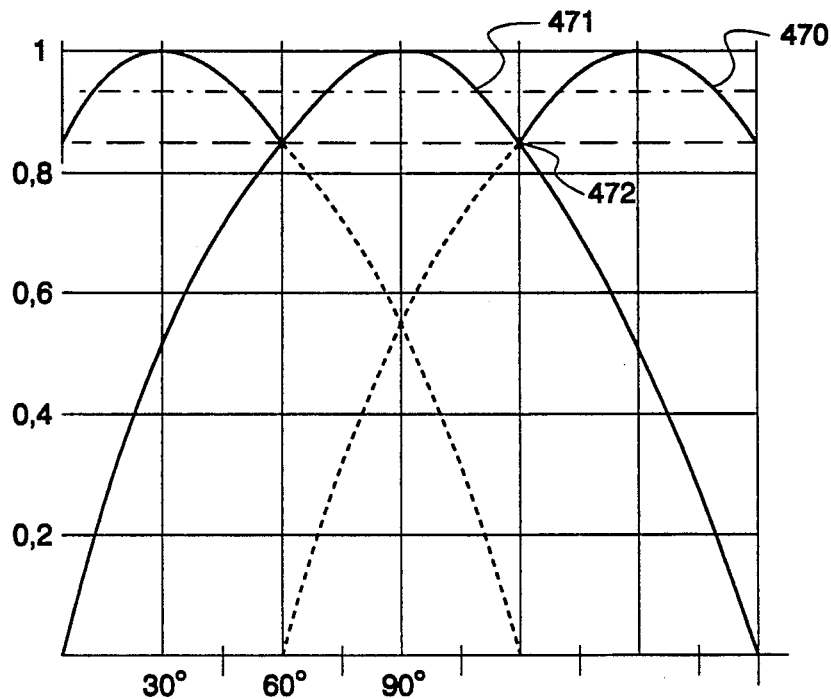
FIG. 16 is a graph showing electromagnetically caused torque configuration against rotor angular position for a prior art motor.

FIG. 15 shows a further possible development of the contour shaping of the stator which improves on the combination of the basic stator shape 414 with the stator correction contours 416 and 417. As shown in FIG. 15, one or more stator poles 463 are given a projection 464, 465 at one, or optionally two, lateral faces (bases) of the stator poles by way of one or more special stator plates.

This configuration is arranged in particular to act on the lower, axially directed end 458 of the rotor magnet, especially where the rotor magnet is hollow and cylindrical. Therefore, the cylinder jacket face of the stator plates can largely be given a maximum diameter, which leads to minimum air gap dimensions and therefore to a better torque or better power level for the motor.

The motor efficiency is also improved in that the interaction face between the permanent magnet 450 and the stator is increased by the projecting, additional, stator surface 464. The projection can be given random surface contours 465, 466, which are effective for reducing slot jerking. In particular, a different section line can be given to each plate layer of the projection, so as to obtain the desired path of the permanent magnetically caused torque component.

Figure 18:
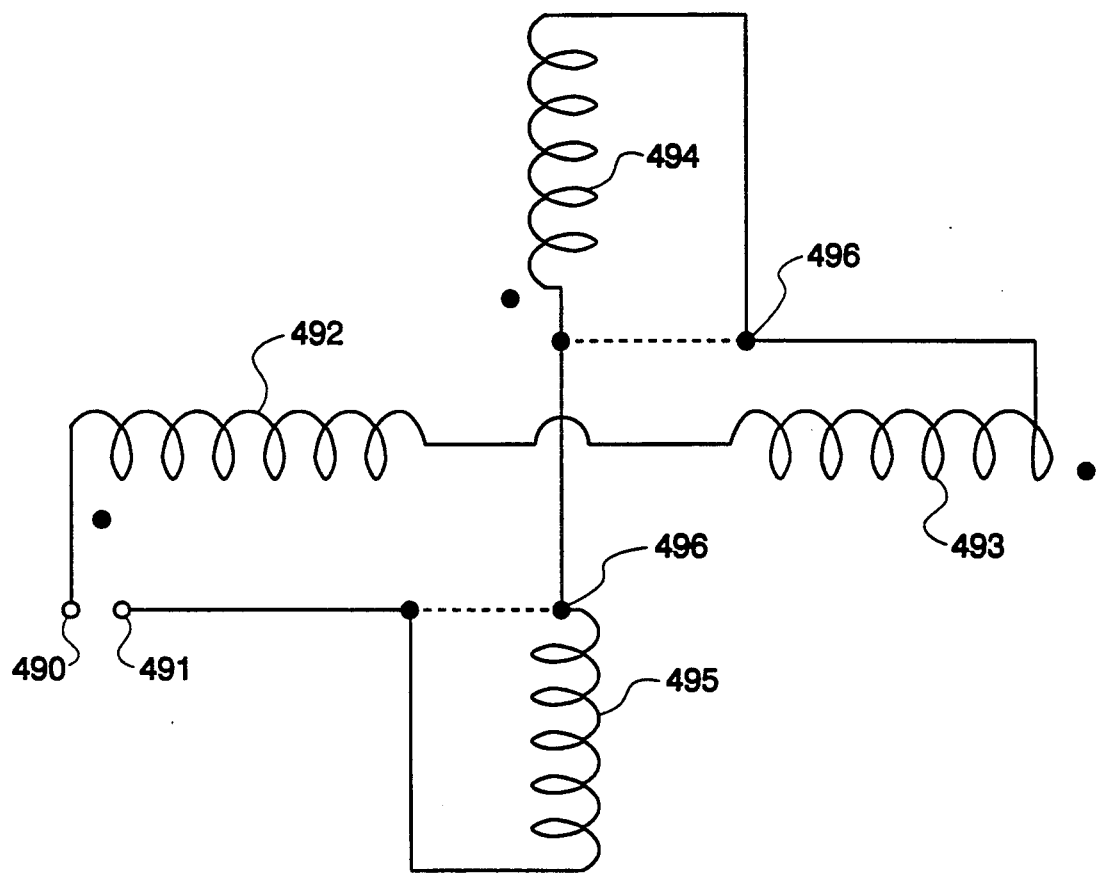
FIG. 18 shows a circuit diagram of the connection of windings formed from coils of stator main poles and coils of stator commutating poles.

A further improvement to the motor efficiency may be obtained by providing an additional winding and by wiring the commutating poles 415. The connection of the commutating pole windings is illustrated in FIG. 18 in which the commutating pole windings 494, 495 are shown connected in series with the main pole windings 492, 493. In the case of a stator having six main poles and six commutating poles, the main poles through which the current jointly flows are at right angles to the commutating poles to which they are connected.

The connection of the commutating poles may, of course, be combined with one or more or all of the aforementioned features. Where all the measures detailed above are used, optimum motor characteristics are obtained, particularly a low electromagnetic torque ripple and low permanent magnetic torque ripple.

Figure 19:
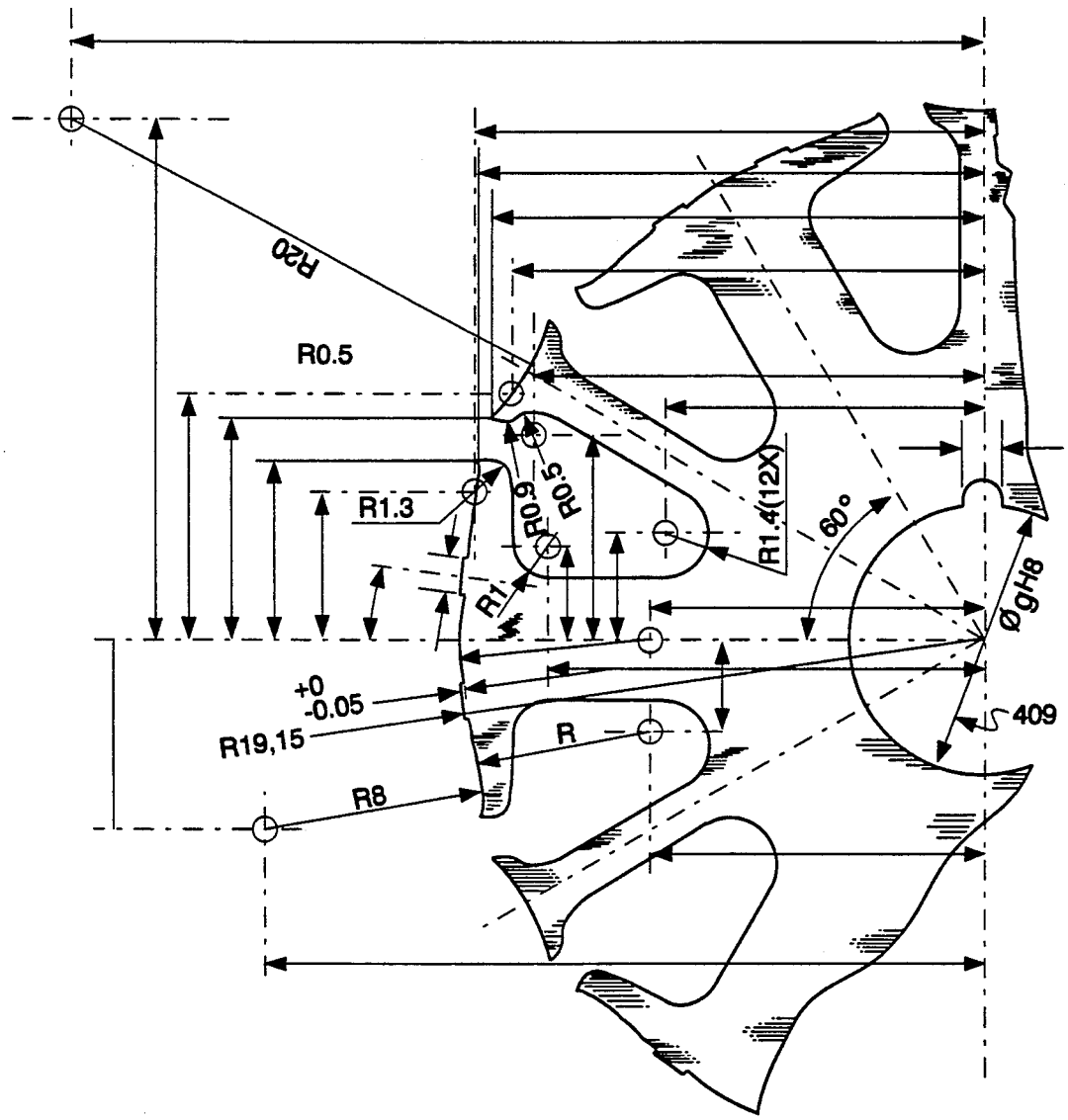
FIG. 19 is a partial view enlarged in more detail of the stator core of FIGS. 10 and 11.
Figure 20:
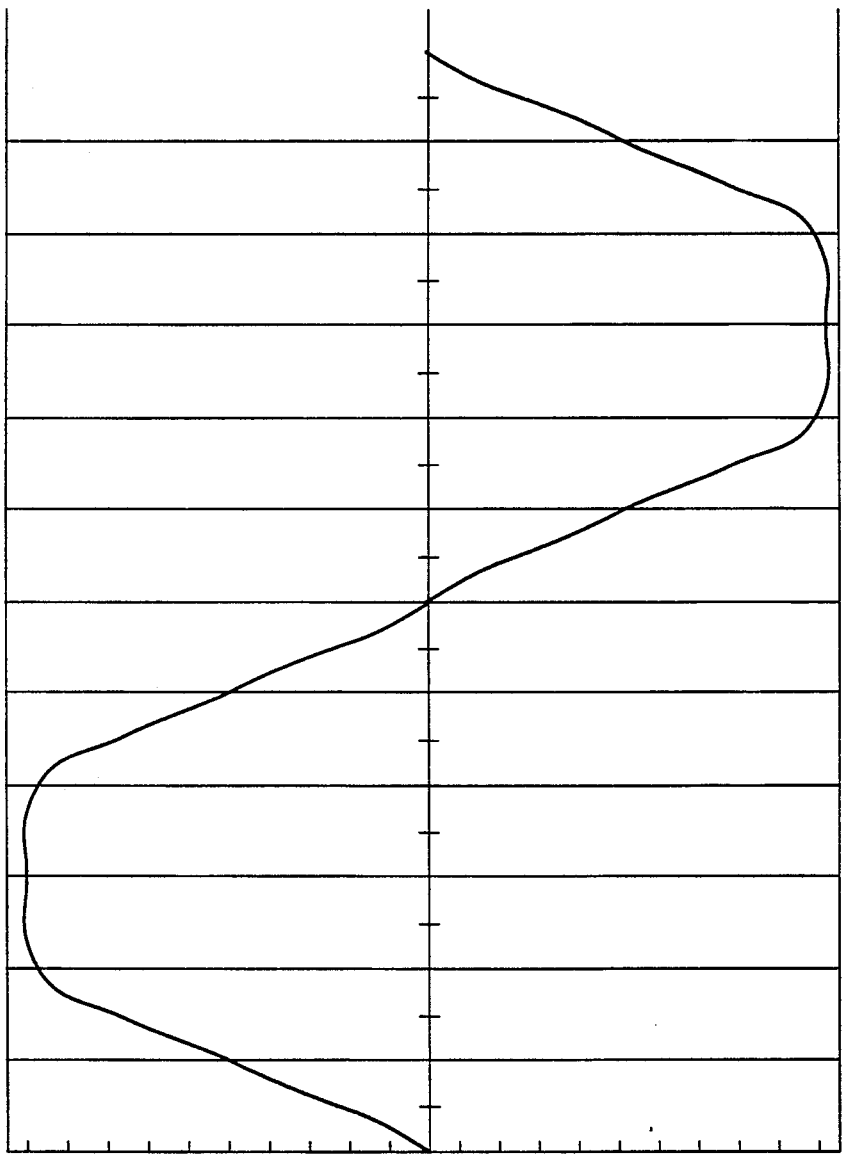
FIG. 20 is a curve of so-called Back-EMF interlinked at two windings of a motor according to FIG. 19.

FIG. 19 shows a more precise representation of the embodiment according to FIG. 20 (or 11), in the correct proportions and with the correct dimensions, taking account of the fact that the central hole 409 has a diameter of 9 mm. The dimensions represent extremely advantageous embodiments, possibly essential for the invention. FIG. 19 clearly shows, e.g., that the main pole core has three times the width of a core of a commutating pole, and that the commutating poles have outwardly concave end faces towards the air gap, the radius of curvature of which is approximately three times the radii provided for a convex curvature on either side of the stator cams 447. These stator cams have the same width in the peripheral direction as the opening of the stator slots, at either side of which, as on the end faces of the commutating poles, there is a concave curvature towards the air gap, this curvature having approximately the same radius as the convex curvatures on either side of the stator cams. This radius is approximately 20 percent of the cylindrical air gap diameter.

The substantially cylindrical air gap of the outer rotor having eight poles is bound by 8 rotor poles, the radially directed magnetization of which is distributed in an approximately rectangular or trapezoidal manner in the peripheral direction (direction of rotation), and if possible extends completely onto the geometric pole pitch, i.e., extends over $180°_{el}$ if possible.

The radially very fine air gap extends substantially axially and in the peripheral direction. Two diametrically opposing main poles of one phase are excited in such a manner that the exciting field has the same polarity towards the air gap. Additionally, excited commutating poles may be situated offset by $90°_{mech}$ relative thereto, and will also have this same polarity towards the air gap. It simply has to be ensured that the poles of one phase and possibly the associated commutating poles are excited simultaneously. To this end, the windings may be connected in series.

The abovementioned trapezoidal magnetization of the rotor permanent magnet is essential for the combined effect of the invention. Example, FIG. 20 shows a so-called Back-EMF interlinked at two windings, i.e., in this embodiment, the three windings are interconnected in a star connection and the induced voltage upon rotation of the rotor (Back-RMF) between two leads indicates that the magnetization of the rotor as described hereinabove must have a trapezoidal distribution. If the voltage at one winding were to be tapped between the star point and the lead, the path of the voltage curve would be "more markedly trapezoidal" or possibly approximately rectangular. This would then give an even better representation of the rotor magnetization.

As, according to the invention, the main pole width corresponds to a rotor pole pitch (180°$_{el}$), the induced voltage in one phase represents the magnetic flow curve of a rotor magnet pitch. The cogging torque associated therewith is equalized by the dimensions and configuration of the stator cams (as shown in detail in FIG. 19 for six main poles and six commutating poles in the stator with eight rotor poles). All similar poles are equidistant. The commutating pole pitch is 60°$_{el}$. The commutating poles can be wound as active auxiliary poles supporting the torque in the manner indicated.

Figure 21:
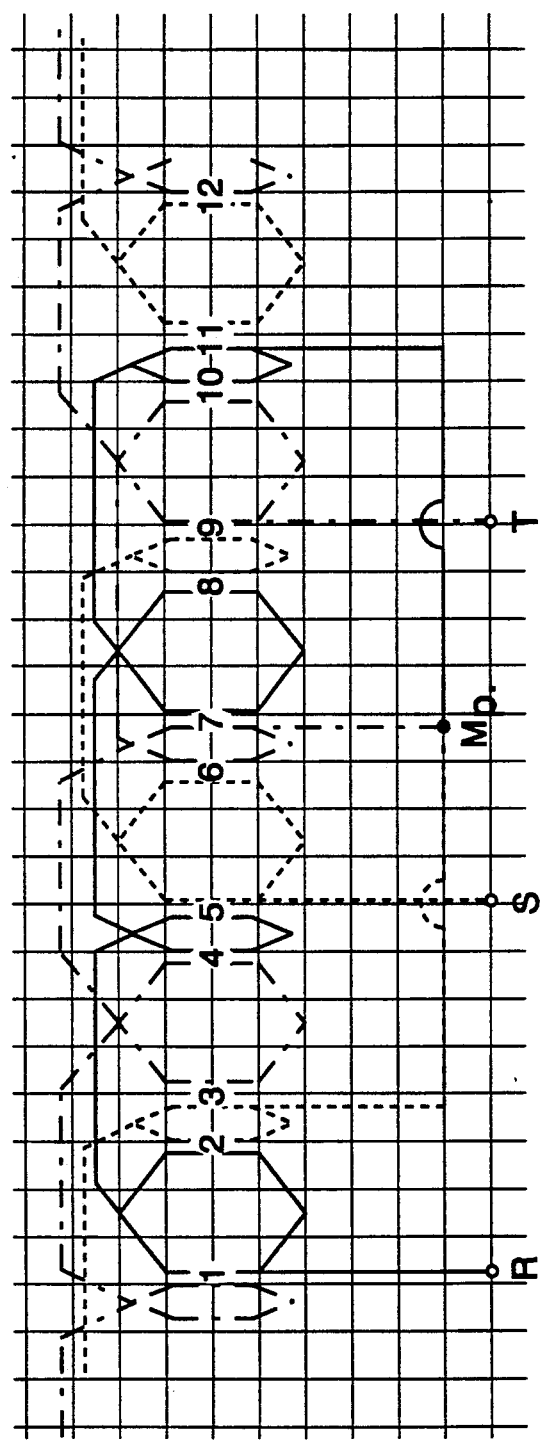
FIG. 21 is a schematic of a winding for wound commutating poles of a motor according to FIG. 19.

FIG. 21 shows a winding diagram for wound commutating poles of the actual motor according to FIG. 19. Each main pole has 100 turns, and each commutating pole 75 turns. MP is the star point of this three-phase winding of the inner stator, which has a relatively small yoke height. The phase R shows clearly the series connection, with the same direction of winding, of

| | |
|---|---|
| the main pole | 1/2 |
| then the commutating pole | 4/5 |
| then the main pole | 7/8 |
| then the commutating pole | 10/11 | towards the star point MP.

Star connection is disadvantageous in similar motors having three phases. The invention obviates this disadvantage, as in many applications it only allows for the use of a delta connection.

The invention results in a relatively low starting current and improved efficiency at normal speed.

One or more of the measures described above may also be combined with measures for equalizing the motor torque. In particular, the current may be supplied to the motor in a rotation angle-dependent and power-dependent manner. The correction quantity for the current is, for example, described by a function or by a table filed in a memory.

Although this procedure presupposes additional electronic components, they may already be present for other reasons and consequently cause little or no additional expenditure when using this operational mode. A method of this type, for example, is described in DE-OS 3941553 A1.

It will be apparent that variations and modifications of the motor as described above may be made. For example, the motor may be constructed as an inner rotor or a linear motor. In addition, the number of stator and rotor poles may be increased. The invention is also not restricted to motors with permanent magnetic rotors and can also be used with soft magnetic rotors. The motor may, of course, also be operated as a generator, and/or as a synchro for determining angular positions of the rotor, or as a stepping motor with a comparatively low power level.

What is claimed is:

1. A multi-phase brushless d.c. electric motor comprising a stator and a magnetic rotor, one of the rotor and stator being hollow and having a substantially cylindrical internal surface, and the other of the stator and rotor having a substantially cylindrical external surface and being received within said internal surface such that a substantially cylindrical air gap is defined between said internal and external surfaces, wherein the stator is arranged to have a number of main poles and a number of auxiliary poles interspersed among the main poles with stator slots having orifices separating all poles around its substantially cylindrical surface, and the rotor has a plurality of magnetic rotor poles around its substantially cylindrical surface, the interaction of the rotor poles and the main and auxiliary poles being arranged to effect rotation of the magnetic rotor, and wherein the substantially cylindrical surface of the stator is provided with protuberances which are generally parallel with respect to the motor axis, and wherein the angular extent of each said main pole of the stat or substantially corresponds to the angular extent of a rotor pole.

2. A multi-phase brushless d.c. electric motor comprising a stator and a magnetic rotor, one of the rotor and stator being hollow and having a substantially cylindrical internal surface, and the other of the stator and rotor having a substantially cylindrical external surface and being received within said internal surface such that a substantially cylindrical air gap is defined between said internal and external air gap is defined between said internal and external surfaces, wherein the stator is arranged to have a number of main poles and a number of auxiliary poles around its substantially cylindrical surface, and the rotor has a plurality of magnetic rotor poles around its substantially cylindrical surface, the interaction of the rotor poles and the main and auxiliary poles being arranged to effect rotation of the magnetic rotor, and wherein the stator has substantially planar end faces, and at least one of said end faces is greater in dimension than an intermediate cross-section of the stator taken between the end faces, wherein the stator end faces are magnetically influenced by one or both end faces of the rotor magnet.

3. An electric motor according to claim 1 or claim 2, wherein the stator carries at least one stator coil which is wound with a two-wire bifilar winding.

4. An electric motor according to claim 1 or claim 2, wherein the induced voltage of two interlinked phases is approximately trapezoidal with respect to angular rotation.

5. An electric motor according to claim 1 or claim 2, arranged as a brushless direct current motor and having a permanent magnetic rotor.

6. An electric motor according to claim 1 or claim 2, and arranged to drive magnetic or optical mass memories.

7. A permanent magnet-excited dynamo with cylindrical air gap and slotted sheet stack according to claim 1 or claim 2, wherein the dynamo is operated as a generator or synchro.

8. An electric motor according to claim 1 or claim 2, wherein the motor is an outer rotor motor.

9. An electric motor according to claim 1 or claim 2, wherein the ratio of the stator main poles to the rotor poles is 3:4.

10. An electric motor according to claim 1, wherein each main pole has at least one of said protuberances on the pole surface extending substantially radially into the air gap, the circumferential width of the protuberances being small compared to the pole pitch, and the at least one protuberance being located circumferentially on the surface of each main pole such that the distance measured in the direction of rotor rotation from the center of a slot to the center of a protuberance on one of the main poles is equal to n times the permanent magnet pole pitch, n being a whole number.

11. A motor according to claim 1, wherein the circumferential extent of the protuberance corresponds to from 0.5 to 1 times the circumferential width of the stator slot orifice.

12. A motor according to claim 11, wherein the air gap directly next to the protuberance as seen in the circumferential direction has the maximum dimension, which dimension decreases in both directions from the protuberance to the stator pole ends, preferably to a value equal to that above the protuberance.

13. A motor according to claim 12 wherein the height of the protuberance is from 0.1 to 0.3 mm with an effective air gap of from 0.3 to 0.6 mm.

14. A motor according to claim 12 wherein the reduction in air gap dimension is gradual and continuous.

15. A motor according to claim 14, wherein the air gap next to the protuberance soon decreases drastically in dimension, the increases again near the stator pole ends and finally decreases directly at the stator pole ends.

16. A motor according to claim 1, wherein the rotor is an internal rotor.

* * * * *

UNITED STATES PATENT AND TRADEMARK OFFICE
CERTIFICATE OF CORRECTION

PATENT NO. : 5,331,245
DATED : July 19, 1994
INVENTOR(S) : Martin BURGBACHER, et al.

It is certified that error appears in the above-indentified patent and that said Letters Patent is hereby corrected as shown below:

IN THE CLAIMS:

Column 12, line 23 (Claim 1, line 20), change "stat or" to read the word --stator--.

Column 12, lines 33-34 (Claim 2, lines 7-8), after "cylindrical," delete second occurrence of the phrase "air gap defined between said internal and external."

Column 14, line 22 (Claim 15, line 3), after the word "dimension" change "the" to read --then--.

Signed and Sealed this

Thirteenth Day of December, 1994

Attest:

BRUCE LEHMAN

Attesting Officer     Commissioner of Patents and Trademarks